(12) United States Patent
Tanaka et al.

(10) Patent No.: US 6,774,525 B2
(45) Date of Patent: Aug. 10, 2004

(54) DYNAMO-ELECTRIC MACHINE

(75) Inventors: Toshinori Tanaka, Tokyo (JP); Akihiro Daikoku, Tokyo (JP); Kyouhei Yamamoto, Tokyo (JP); Kei Yonemori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 177 days.

(21) Appl. No.: 09/931,564

(22) Filed: Aug. 17, 2001

(65) Prior Publication Data

US 2002/0079774 A1 Jun. 27, 2002

(30) Foreign Application Priority Data

Dec. 25, 2000 (JP) ........................................ 2000-393089

(51) Int. Cl.⁷ ................................................. H02K 3/16
(52) U.S. Cl. ...................... 310/233; 310/233; 310/206; 310/207; 310/71
(58) Field of Search ................................ 310/233, 204, 310/71, 206, 207

(56) References Cited

U.S. PATENT DOCUMENTS

| 6,057,626 A | * | 5/2000 | Tanaka | 310/233 |
| 6,075,305 A | * | 6/2000 | Daikoku | 310/233 |
| 6,127,759 A | * | 10/2000 | Tanaka | 310/233 |
| 6,236,137 B1 | * | 5/2001 | Tanaka | 319/233 |
| 6,462,454 B2 | * | 10/2002 | Yamamoto | 310/207 |

FOREIGN PATENT DOCUMENTS

JP    2000-224822    8/2000

* cited by examiner

Primary Examiner—Thomas M. Dougherty
Assistant Examiner—Iraj A. Moahndesi
(74) Attorney, Agent, or Firm—Sughrue Mion, PLLC

(57) ABSTRACT

The present invention provides a dynamo-electric machine that prevents the lead portions of the coil portions disposed at places, at which mechanical balance is provided, from intersecting each other, that enhances the workability in manufacturing the wiring by wiring a conductor, and that suppresses the defective insulation of the winding. This dynamo-electric machine for use in an electric power steering system has a yoke, n (incidentally, "n" is a common divisor of the number of the magnetic poles and the number of the slots and equal to or more than 2) of the coil portions are parallel-connected between the segments. Moreover, the coil portions are disposed in such a manner as to be symmetrical with respect to a mechanical angle of 360 degrees. Lead parts of the coil portions other than one of the coil portions, which is nearest in a circumferential direction to each of the segments, are drawn therefrom in the same circumferential direction.

8 Claims, 16 Drawing Sheets

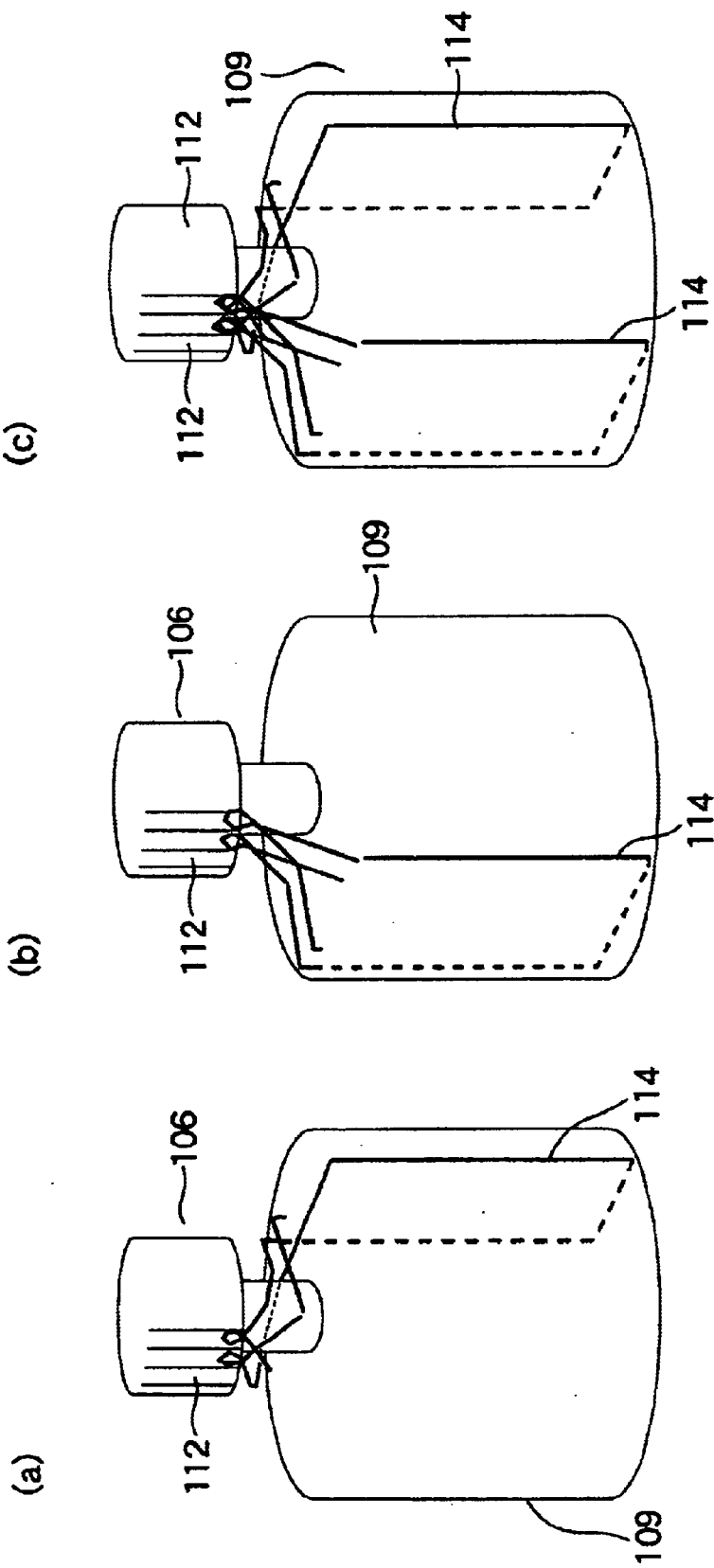

DYNAMO-ELECTRIC MACHINE

BACKGROUND OF THE INVENTION

1. Field of the Invention

The present invention generally relates to a dynamo-electric machine having a commutator that includes a plurality of segments.

2. Description of the Related Art

FIG. 11 is a side sectional diagram of a motor 100 for use in an electric power steering system, which is a conventional dynamo-electric machine. This motor 100 for an electric power steering system comprises a cylindrical yoke 101, magnetic poles 102 constituted by permanent magnets, the number of which is 4, and fixed in this yoke 101, a shaft 104 provided in the yoke 101 in such a manner as to be enabled by a bearing 103 to freely rotate, an armature 105 fixed to this shaft 104, a commutator 106 fixed to an end portion of the shaft 104, and brushes 108 made by elastic forces of springs (not shown) to abut against the surface of this commutator 106 and held by brush holders 107.

The armature 105 comprises a core 109 having twenty-two slots, which axially extend, and a winding 111 constituted by a conductor lap-wound through the slots 110.

The hollow-cylinder-like commutator 106 has twenty-two copper segments 112 disposed at equal intervals, and resin materials, placed between adjacent segments 112, for holding and insulating the adjacent segments 112 from each other.

In the four-pole lap-wound motor 100 for use in the electric power steering system, electric current is externally supplied to the wiring 111 through the brushes 108 that abut against the segments 112. Consequently, the armature 105 rotates together with the shaft 104 by electromagnetic action.

FIGS. 12 and 13 are developed plan winding diagrams each illustrating the cylindrical arrangement of the winding 111, the magnetic poles 102, the commutator 106, and the brushes 108 in the direction of rotation so as to explain the positional relation among the mounting positions of these members.

As shown in FIG. 11, the motor 100 for use in an electric power steering system has twenty-two teeth 113, twenty-two segments 112, and four magnetic poles 102. For easy understanding of the connection relation between the coil portions 114 and the segments 112, this figure shows such an arrangement throughout a range longer than an actual range, that is, a range of more 360 degrees (720 degrees in this case) in terms of a mechanical angle.

Portions designated by characters "N" and "S" are the magnetic poles 102. Further, parts, each of which is designated by one of symbols "+" and "−" described at the bottom thereof, are the brushes 108. Rectangles, to which the numbers 1 to 22 described under the characters "N" and "S" are respectively assigned, are the teeth 113 for defining the slots 110. Further, rectangles described just above the brushes 108, to which the numbers 1 to 22 are respectively assigned, are the segments 112.

As illustrated in FIG. 14, each of the windings 111 of this example is constituted by what is called "double winding", in which the two coil portions 114 are parallel-connected between each pair of adjacent ones of the segments 112. FIG. 12 is a winding diagram illustrating the outer (or upper) winding 111 provided in the radial direction of the core 109 of the armature 105, between the windings. FIG. 13 is a winding diagram illustrating the inner (or lower) winding 111 provided in the radial direction of the core 109 of the armature 105, between the windings.

The windings 111 constituted by the "double winding" has advantages over what is called "single winding" in that thinner conductors can be used, and that thus the workability in winding is enhanced.

Incidentally, in the case of each of the coil portions 114 indicated by dotted lines in FIG. 14, each of the brushes 108 is brought into abutting engagement with two of the segment 112, as shown in FIG. 15. Thus, these segments are at equal electric potential. Consequently, the dotted lines indicate that no current flows through the corresponding wiring portion 114.

In the case of this example having a total of twenty-two segments 112, twenty-two coil portions are disposed at each of the upper and lower sides of the winding 111. However, as illustrated in FIGS. 16(a) to 16(c), instead of inserting the coil portions 114, which are provided correspondingly to the upper and lower sides, into the same slot, such coil portions 114 are inserted into magnetically symmetrical different slots.

Meanwhile, attention is now focused on an upper-side coil portion 114A and a lower-side coil portion 114B of the winding 111 connected between the segment No. 12 and the segment No. 13 of the segments 112. The upper-side coil portion 114A is constructed by winding a conductor a plurality of times between a slot 110, which is formed between the tooth No. 10 and the tooth No. 11 of the teeth 113, and another slot 110, which is formed between the tooth No. 15 and the tooth No. 16 of the teeth 113. Thus, this coil portion 114A is placed nearly just above the segment No. 12 and the segment No. 13 of the segments 112. On the other hand, the lower-side coil portion 114B is constructed by winding a conductor a plurality of times between a slot 110, which is formed between the tooth No. 21 and the tooth No. 22 of the teeth 113, and another slot 110, which is formed between the tooth No. 4 and the tooth No. 5 of the teeth 113. Thus, this coil portion 114B is placed nearly just above the segment No. 1 and the segment No. 2 of the segments 112. That is, the upper-side coil portion 114A and the lower-side coil portion 114B, which employ the segment No. 12 as the common start point and also employ the segment No. 13 as the common end point, are apart from each other by 180 degrees in terms of a mechanical angle.

With such an arrangement, the coil portions 114 rectified with the same timing are always disposed at positions at which mechanical balance is provided, even when inconvenience occurs at the brush 108 at one side or when a subtle deviation in characteristics is caused owing to individual difference. Thus, vibrations due to an electromagnetic force are suppressed.

As is seen from FIG. 13, in the motor 100 of the aforementioned configuration for use in an electric power steering system, lead parts 115B of the lower-side portion 114 of the winding 111, which are connected to the segments 112, become long and intersect each other. Thus, the conventional dynamo-electric machine has drawbacks in that a coil end portion of the armature 105 becomes large, that the workability in manufacturing the winding 111 by winding a conductor is low, and that defective insulation of the wiring 111 is liable to occur.

The present invention is created to eliminate the aforementioned drawbacks. Accordingly, an object of the present invention is to provide a dynamo-electric machine that prevents the lead portions of the coil portions disposed at places, at which mechanical balance is provided, from intersecting each other, that enhances the workability in manufacturing the wiring by wiring a conductor, and that suppresses the defective insulation of the winding.

SUMMARY OF THE INVENTION

To achieve the foregoing object, according to an aspect of the present invention, there is provided a dynamo-electric machine, which comprises a yoke, magnetic poles fixed in this yoke, a shaft rotatably provided in the yoke, an armature having a winding consisting of a plurality of coil portions each formed by lap-winding a conductor between a corresponding pair of slots formed in an outer circumferential surface portion of a core fixed to this shaft in such a way as to extend in an axial direction thereof, a commutator fixed to an end portion of the shaft and having a plurality of segments to which lead parts of both end sections of the coil portions are electrically connected, and brushes made to respectively abut against the surfaces of the segments of the commutator. In this dynamo-electric machine, n (incidentally, "n" is a common divisor of the number of the magnetic poles and the number of the slots and equal to or more than 2) of the coil portions are parallel-connected between the segments. The coil portions are disposed in such a manner as to be symmetrical with respect to a mechanical angle of 360 degrees. Lead parts of the coil portions other than one of the coil portions, which is nearest in a circumferential direction to each of the segments, are drawn therefrom in a same circumferential direction.

According to another aspect of the present invention, there is provided a dynamo-electric machine which comprises a shaft, an armature having a winding consisting of a plurality of coil portions formed by lap-winding and wave-winding a conductor between each pair of slots formed in an outer circumferential surface portion of a core fixed to this shaft in such a way as to extend in an axial direction thereof, a commutator fixed to an end portion of the shaft and having a plurality of segments to which lead parts of both end sections of the lap-wound and wave-wound coil portions are electrically connected, and brushes made to respectively abut against the surfaces of the segments of the commutator. In this dynamo-electric machine, the lap-wound coil portion and the wave-wound coil portion, the respective of which have lead parts to be connected to a same one of the segments, are disposed in such a manner as to be symmetrical with respect to a mechanical angle of 360 degrees. Both lead parts of the wave-wound coil portions are drawn therefrom in a same circumferential direction.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 16($a$) to 16($c$) are diagrams each illustrating the positional relation among the coil portions shown in FIG. 11.

DESCRIPTION OF THE PREFERRED EMBODIMENTS

Figure 1:
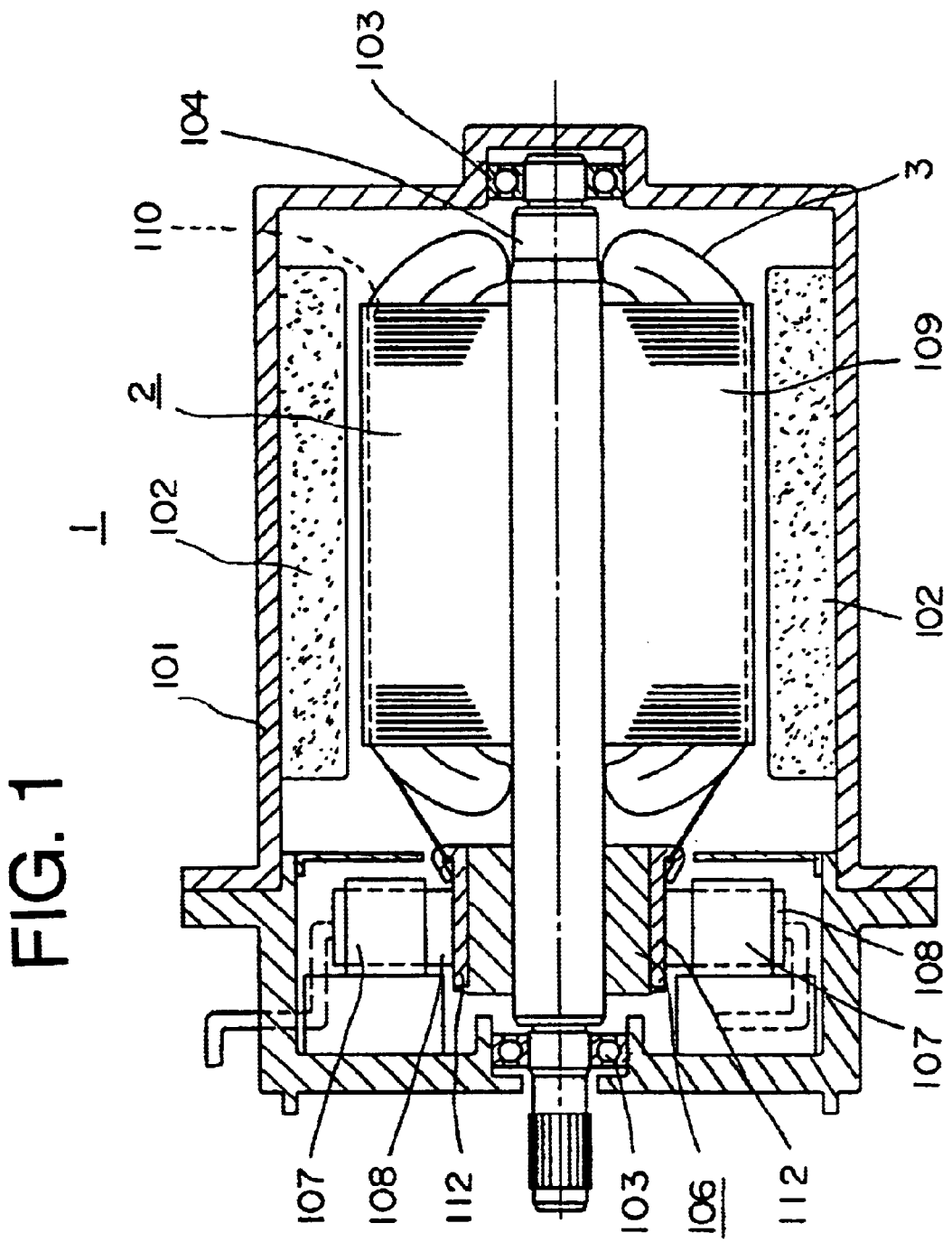
FIG. 1 is a sectional diagram illustrating a motor for use in an electric power steering system, which is a first embodiment of the present invention.

Hereinafter, the preferred embodiments of the present invention will be described in detail by referring to the accompanying drawings. Like reference characters designate like or corresponding parts of the conventional dynamo-electric machine.

First Embodiment

Figure 2:
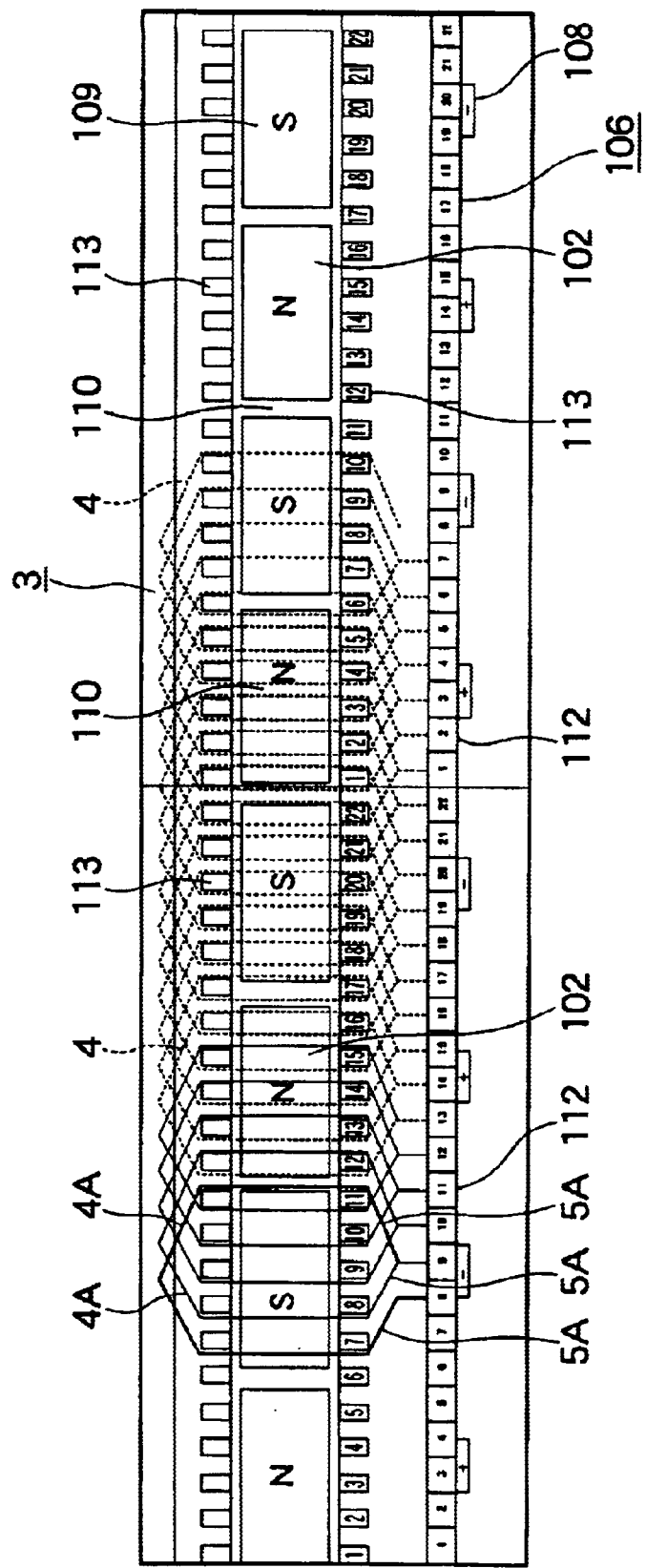
FIG. 2 is a winding diagram illustrating an upper-side winding of the motor shown in FIG. 1 for use in an electric power steering system.
Figure 3:
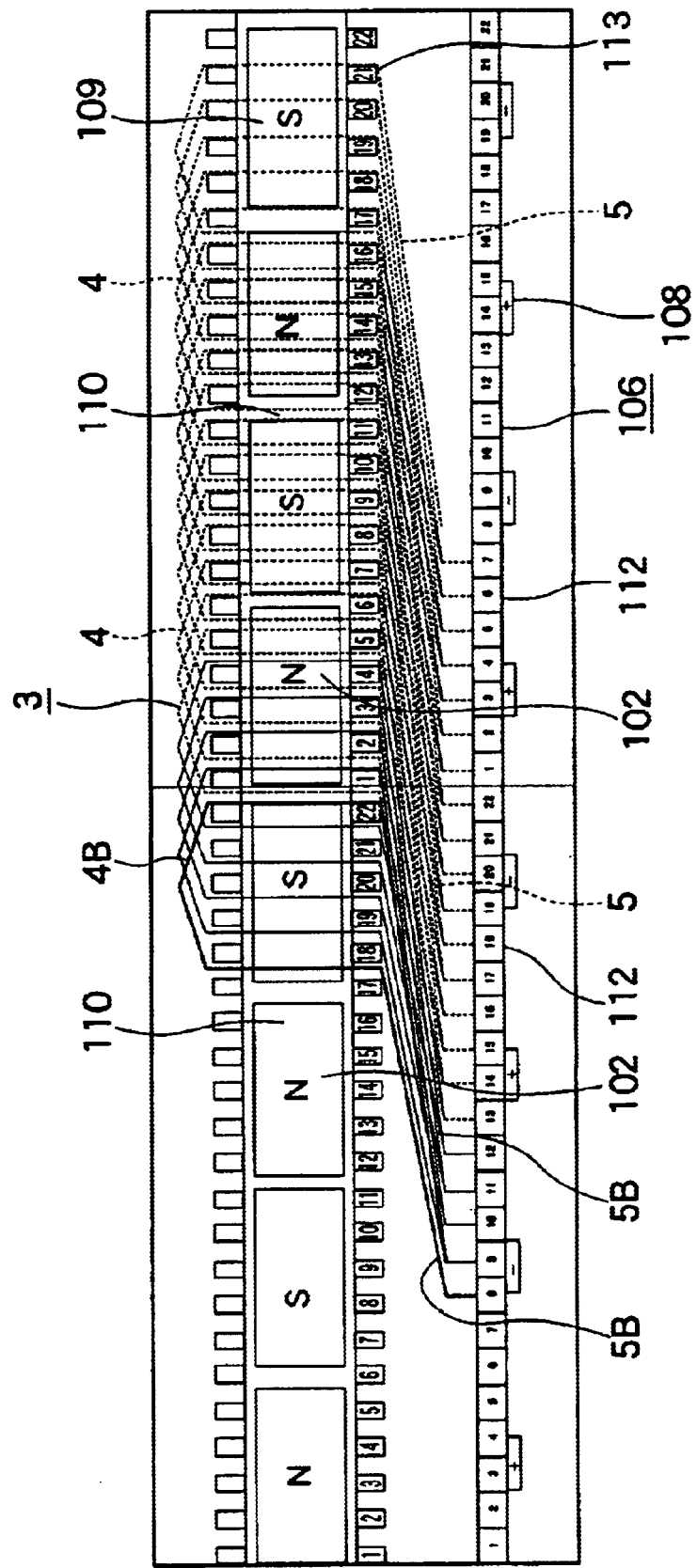
FIG. 3 is a winding diagram illustrating a lower-side winding of the motor shown in FIG. 1 for use in an electric power steering system.

FIG. 1 is a sectional diagram illustrating a motor 1, which is a first embodiment of the present invention, for use in an electric power steering system. FIGS. 2 and 3 are winding diagrams each illustrating the motor 1 shown in FIG. 1 for use in an electric power steering system.

This motor 1 for use in an electric power steering system has a cylindrical yoke 101, magnetic poles 102 constituted by permanent magnets fixed in this yoke 101, a shaft 104 provided in the yoke 101 in such a manner as to be enabled by a bearing 103 to freely rotate, an armature 2 fixed to this shaft 104, a commutator 106 fixed to an end portion of the shaft 104, and brushes 108 made by elastic forces of springs (not shown) to abut against the surface of this commutator 106 and held by brush holders 107.

The armature 2 comprises a core 109 having a plurality of slots, which axially extend, and a winding 3 constituted by a conductor lap-wound through the slots 110.

The hollow-cylinder-like commutator 106 has twenty-two copper segments 112 disposed at equal intervals, and resin materials for insulating the adjacent segments 112 from each other.

In the four-pole lap-wound motor 1 for use in an electric power steering system, electric current is externally supplied to the winding 3 through the brushes 108 that abut against the segments 112. Consequently, the armature 2 rotates together with the shaft 104 by electromagnetic action.

FIGS. 2 and 3 are developed plan winding diagrams each illustrating the cylindrical arrangement of the winding 3, the magnetic poles 102, the commutator 106, and the brushes 108 in the direction of rotation so as to explain the positional relation among the mounting positions of these members.

As shown in FIG. 1, the motor 1 for use in an electric power steering system has twenty-two teeth 113, twenty-two segments 112, and four magnetic poles 102. For easy understanding of the connection relation between the coil portions 4 and the segments 112, this figure shows such an arrangement throughout a range longer than an actual range, that is, a range of more 360 degrees (720 degrees in this case) in terms of a mechanical angle.

Portions designated by characters "N" and "S" are the magnetic poles 102. Further, parts, each of which is designated by one of symbols "+" and "−" described at the bottom thereof, are the brushes 108. Rectangles, to which the numbers 1 to 22 described under the characters "N" and "S" are respectively assigned, are the teeth 113 for defining the slots 110. Further, rectangles described just above the brushes 108, to which the numbers 1 to 22 are respectively assigned, are the segments 112. A group of wires drawn from one of the segments 112, which is employed as a start point, pass through the slot 110 and face the magnetic pole 102 and then return to another of the segments 112. This group is a coil portion 4 that is a constituent element of the winding 3.

Each of the windings 3 of this embodiment is constituted by what is called "double winding", in which the two coil portions 4 are parallel-connected between each pair of adjacent ones of the segments 112. FIG. 2 is a winding diagram illustrating the outer (or upper) winding 111 provided in the radial direction of the core 109, between the windings. FIG. 3 is a winding diagram illustrating the inner (or lower) winding 111 provided in the radial direction of the core 109, between the windings.

In the case of this embodiment, the number of parallel circuit portions provided between the segments 112 is 2. Moreover, twenty-two coil portions 4 are provided at each of the upper side and the lower side. However, instead of inserting the two coil portions 4 into the same slot 110 at the upper side and the lower side, the portions 4 are placed in the magnetically symmetric slots 110, respectively.

Meanwhile, attention is now focused on an upper-side coil portion 4A and a lower-side coil portion 4B of the winding 3 connected between the segment No. 8 and the segment No. 9 of the segments 112. The upper-side coil portion 4A is constructed by winding a conductor a plurality of times between a slot 110, which is formed between the tooth No. 6 and the tooth No. 7 of the teeth 113, and another slot 110, which is formed between the tooth No. 11 and the tooth No. 12 of the teeth 113. Thus, this coil portion 4A is placed nearly just above the segment No. 8 and the segment No. 9 of the segments 112. On the other hand, the lower-side coil portion 4B is constructed by winding a conductor a plurality of times between a slot 110, which is formed between the tooth No. 17 and the tooth No. 18 of the teeth 113, and another slot 110, which is formed between the tooth No. 22 and the tooth No. 1 of the teeth 113. Thus, this coil portion 4B is placed nearly just above the segment No. 19 and the segment No. 20 of the segments 112. That is, the upper-side coil portion 4A and the lower-side coil portion 4B, which employ the segment No. 8 as the common start point and also employ the segment No. 9 as the common end point, are apart from each other by 180 degrees in terms of a mechanical angle.

With such an arrangement, the coil portions 4 rectified with the same timing are always disposed at positions at which mechanical balance is provided, even when inconvenience occurs at the brush 108 at one side or when a subtle deviation in characteristics is caused owing to individual difference. Thus, vibrations due to an electromagnetic force are suppressed.

Differently from the conventional motor, in which lead parts 115B of the lower-side portion 114 at the lower side of the armature 105 intersect each other, this embodiment 1 is configured so that the lead parts 5B at both end sections of the lower-side coil portion 4 are drawn out therefrom in the same direction. Thus, the lead parts 5B do not intersect each other. Consequently, this facilitates the operation of winding the conductors so as to manufacture the winding 3. Moreover, an occurrence of defective insulation is suppressed.

Figure 4:
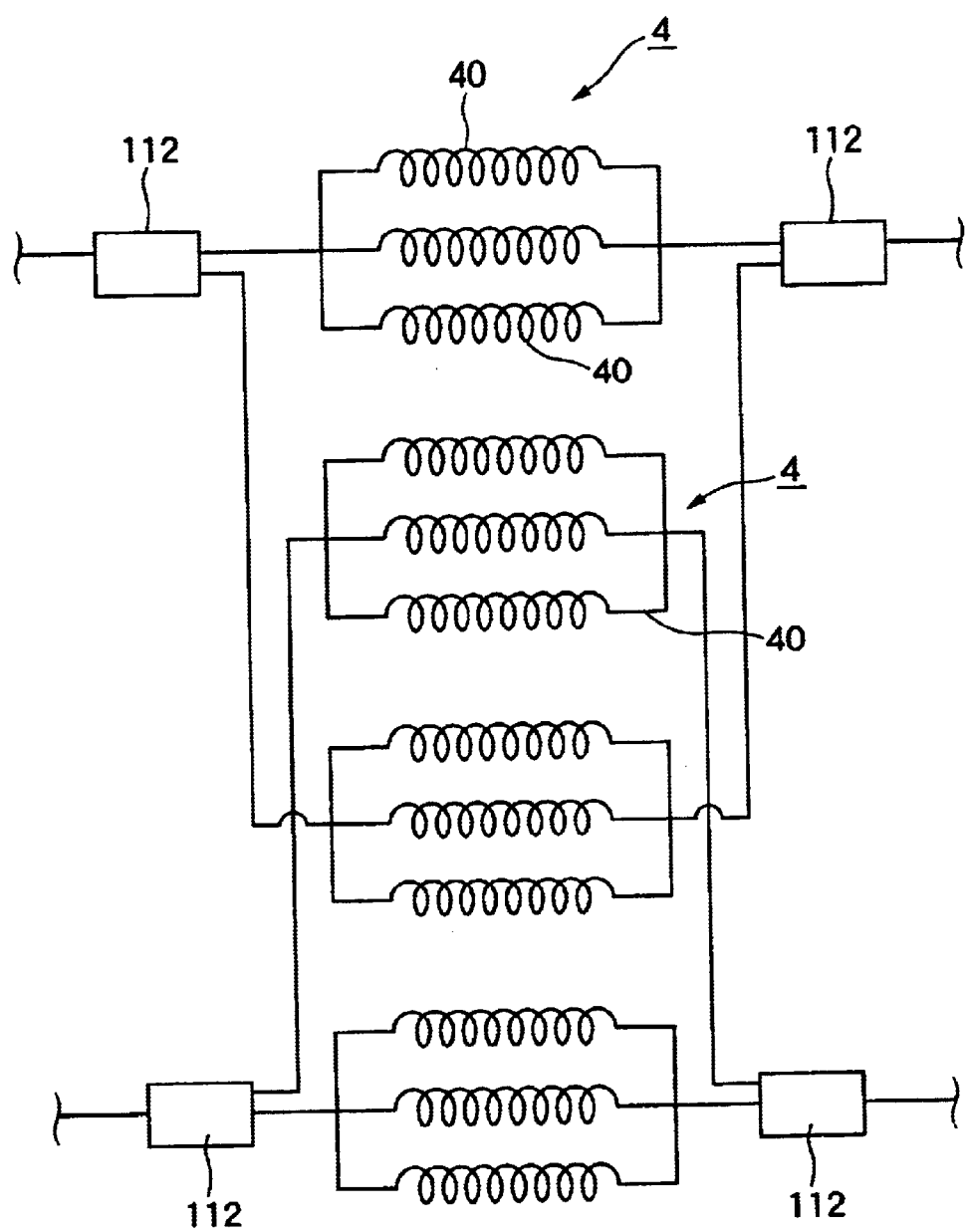
FIG. 4 is a diagram illustrating a modification of parallel-connected coil portions.

Incidentally, as illustrated in FIG. 4, the coil portion 4 may be constituted by a plurality of parallel-connected small coil portions 40. In this case, the embodiment has advantages in that thinner conductors can be used for the small coil portions 40, and that the workability in winding conductors is enhanced.

Figure 5:
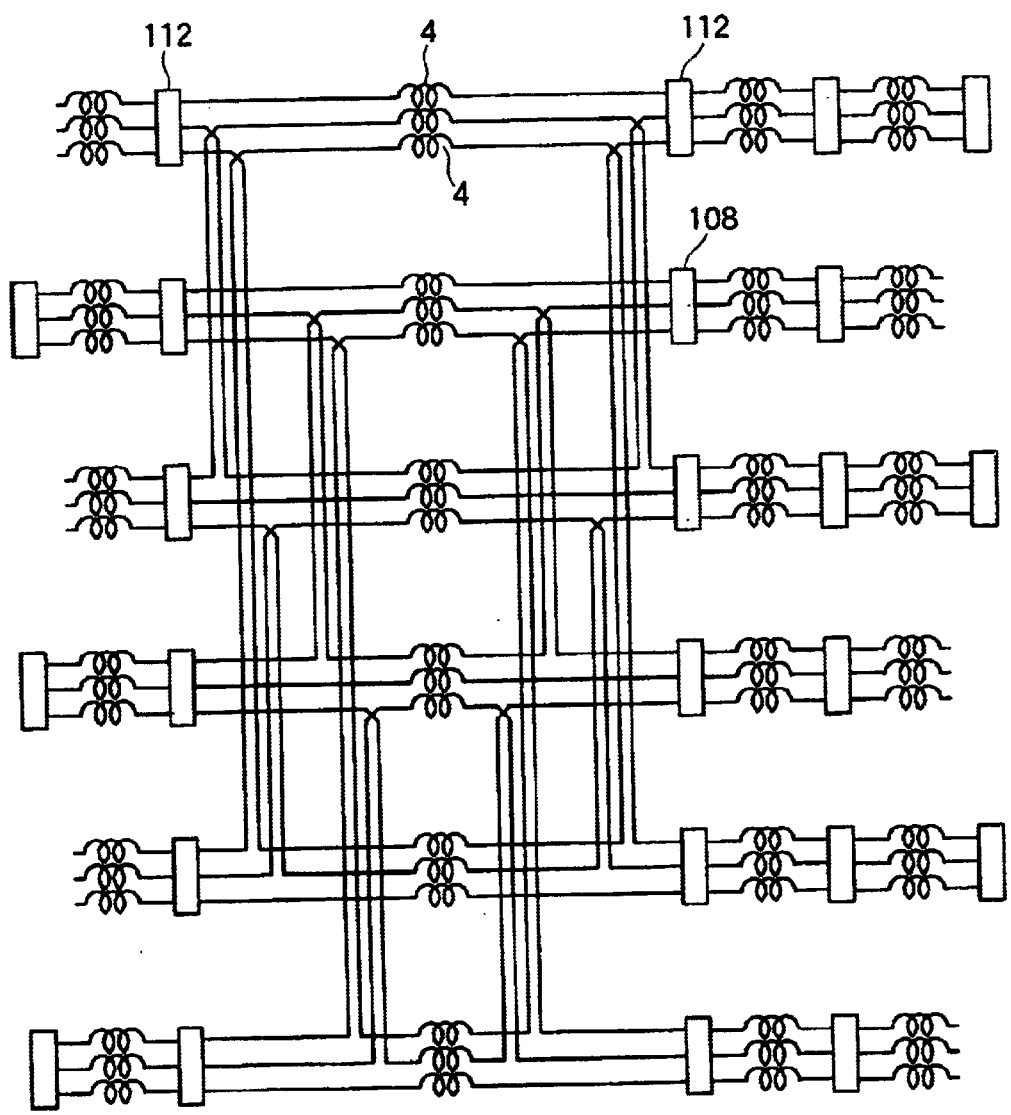
FIG. 5 is a diagram illustrating another modification of parallel-connected coil portions.

Further, in this embodiment, the number of slots is 22, and the number of poles is 4, and the number of the parallel circuits provided between the segments 112 is 2. That is, the armature 2 comprises parallel-connected two coil portions 4. Needless to say, the invention is not limited to this armature. For instance, in the case that the number of magnetic poles is 6, and that the number of slots is 24 as illustrated in FIG. 5, it is sufficient that the number of parallel circuits is set at 3, and that three coil portions are disposed at angular equal intervals of 120 degrees in terms of a mechanical angle. In this case, it is sufficient that one of the coil portions is placed just near to the segment to which this coil portion is connected through the lead part thereof, and that the remaining two coil portions are disposed by drawing out the lead parts thereof in the same direction to prevent these lead parts from intersecting each other.

Incidentally, it is necessary from the viewpoint of realizing uniform electromagnetic forces that the number "n" of the coil portions 4 provided between the segments 112 is set at a common divisor of the number of magnetic forces 102 and the number of the slots 110. For example, when the number of magnetic poles is 6 and the number of the slots is 24, the common divisors of 6 and 24 are 1, 2, 3, and 6. Thus, the number of the coil portions can be set at 1, 2, 3, or 6. However, when 1 is selected as the number of the coil portions, parallel circuits cannot be provided between the segments 112. Thus, 1 is excluded from the allowable values of the number of the coil portions.

Second Embodiment

Figure 6:
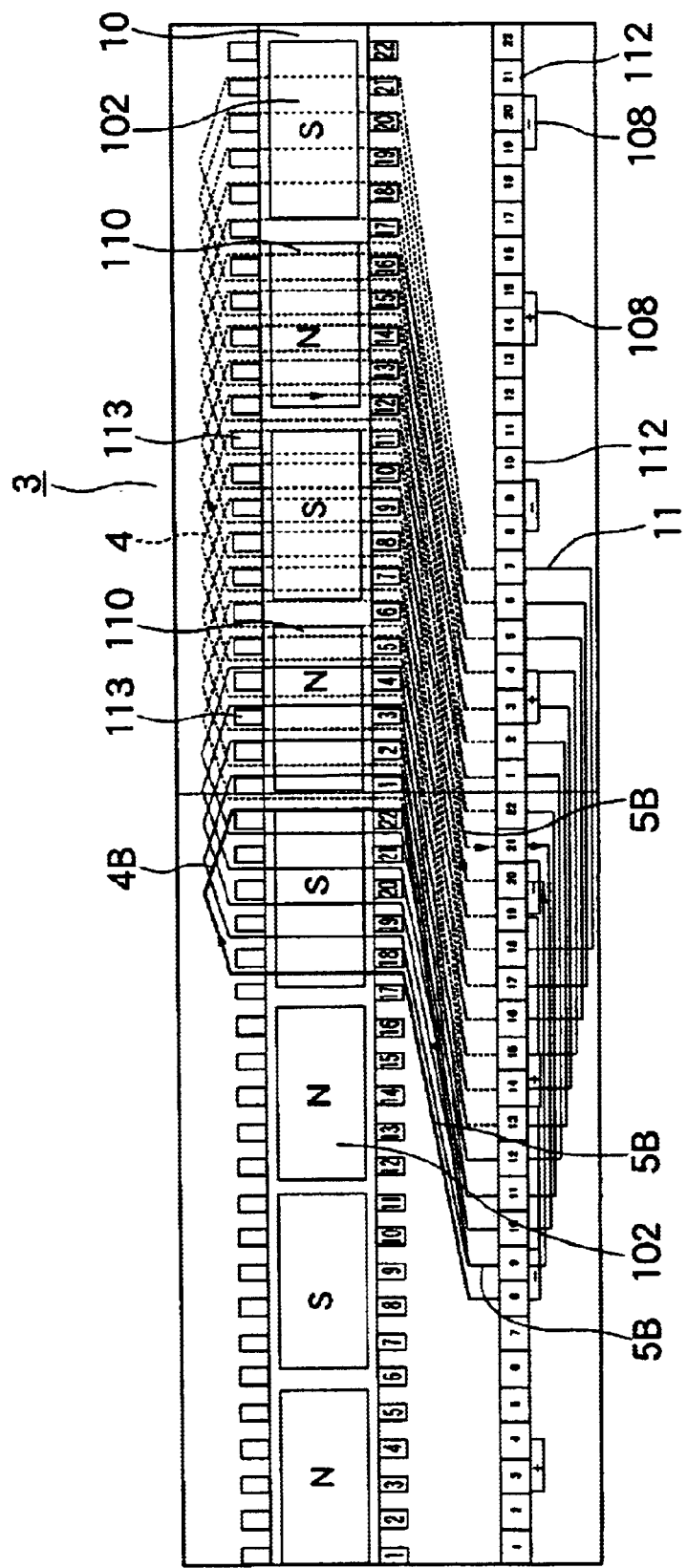
FIG. 6 is a winding diagram illustrating a lower-side winding of a motor for use in an electric power steering system, which is a second embodiment of the present invention.

FIG. 6 is a wining diagram illustrating the lower-side winding 3 of a motor, which is a second embodiment of the present invention, for use in an electric power steering system. Incidentally, the upper-side winding 3 of this motor is the same as illustrated in FIG. 2.

The second embodiment differs from the first embodiment in that the segments 112, which should be at equal electric potential, are connected by an equalizer 11.

In the motor, which is the second embodiment, for use in an electric power steering system, the segments 112 to be put at equal electric potential are electrically connected by the equalizer 11, so that a circulating current is prevented from flowing through circuit portions between the brushes 108 of the winding 3 owing to the difference among voltages induced in the circuit portions. Additionally, an occurrence of magnetic-attraction-force imbalance due to the difference in the number of coil portions among the electric circuit portions is prevented.

Figure 7:
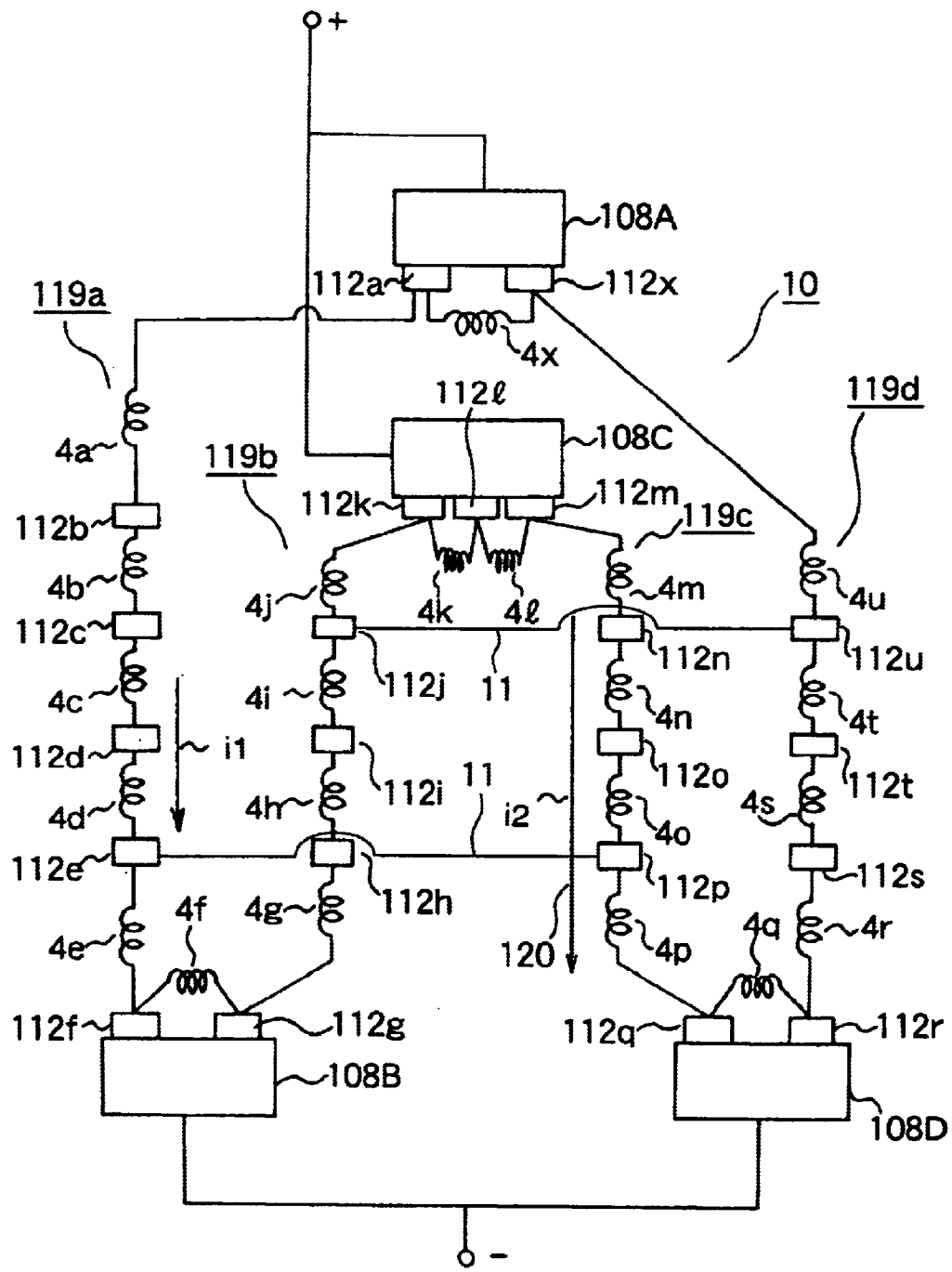
FIG. 7 is a circuit diagram illustrating an electric circuit of the motor shown in FIG. 6 for use in an electric power steering system.

Hereinafter, such features of the second embodiment are described in detail. FIG. 7 is a circuit diagram illustrating an electric circuit in which the coil portions 4 of the armature 10 are connected to the segments 112. In the following description, the following members, that is, explanation is given by respectively adding an alphabetical character to the right side of each of reference numerals designating the brushes, the segments and the coil portions.

For example, in the case that originally, three of the segments 112 should abut against the first brush 108A and the third brush 108C, that two of the segments 112 should abut against the second brush 108B and the fourth brush 108D, only two segments, that is, the first segment 112a and the second segment 112x may abut against the first brush 108A for a moment. As a result, the first to fourth electric circuit portions 119a to 119d among the first to fourth brushes 108A to 108D may differ from one another in the number of the coil portions 4, which should be 4 in each of these electric circuit portions at that time. That is, in the first circuit portion 119a, the first coil portions 4a to the fifth coil portions 4e intervene between the segments 112a and 112f. Thus, five of the coil portions 4 intervene therebetween. Therefore, the value of an electric current i1 flowing through the first electric circuit portion 119a and that of an electric current i2 flowing through the third electric circuit portion 119c, which should be equal to each other, are different from each other. This results in imbalance in magnetic attraction forces acting on the armature 10. Consequently, an exciting force is generated in the armature 10. Thus, operating sounds are produced. However, because, for example, the segments 112e and 112p are electrically connected to each other by the equalizer 11, the voltage level of the segment 112e of the first electric circuit portion 119a is equal to that of the segment 112p of the third electric portion 119c. This results in balanced magnetic attraction forces. Thus, the exciting force is reduced. Incidentally, only two equalizers 11 are shown in FIG. 7, and the remaining ten equalizers are omitted for simplicity of drawing.

Next, a procedure for connecting the coil portions 4 of the armature 10 to the segments 112 and then connecting the segments 112 to each other by the equalizers 11 is described hereinbelow. Incidentally, members made of the same material, that is, enamel-coated round wires are used as the conductor and the equalizer 11. Moreover, the winding 3 and the equalizer 11 are continuously connected to each other.

For example, in FIG. 6 showing the lower (or radially inner side) of the winding 3, the lap-wound coil portion 4B connected to the segment No. 8 of the segments 112 through a lead part 5B is constituted by winding the conductor a plurality of times between the slot 110, which is provided between the tooth No. 17 and the tooth No. 18 of the teeth 113, and the slot 110 provided between the tooth No. 22 and the tooth No. 1 of the teeth 113. Then, the coil portion 4B is connected to the segment No. 9 of the segments 112 through the lead part 5B. Thereafter, the equalizer 11 drawn out from the segment No. 9 of the segments 112 is connected to the segment No. 20 of the segments 112. Subsequently, the construction of the coil portion 4B connected to the segment No. 20 of the segments 112 through the lead part 5B is resumed by further winding the connector a plurality of times between the slot 110, which is provided between the tooth No. 7 and the tooth No. 8, and the slot 11 provided between the tooth No. 12 and the tooth No. 13 of the teeth 113. Furthermore, the coil portion 4B is connected to the segment No. 21 of the segments 112 through the lead part 5B. Then, the equalizer 11 drawn out from the segment No. 21 of the segments 112 is connected to the segment No. 10 of the segments 112. Subsequently, the construction of the coil portion 4B connected to the segment No. 10 of the segments 112 is resumed by further winding the conductor a plurality of times between the slot 110, which is provided between the tooth No. 19 and the tooth No. 20, and the slot 110 provided between the tooth No. 2 and the tooth No 3 of the teeth 113. Subsequently, the coil portion 4B is connected to the segment No. 11 of the segments 112 through the lead part 5B. Thus, the coil portion 4B is formed by changing the positions of the slots to be used. Consequently, the lower side portion of the winding 3 is manufactured.

Thereafter, the upper side (that is, the radially outer side) portion of the winding 3 is formed. At the upper side, as shown in FIG. 2, the lap-wound coil portion 4A connected to the segment No. 8 through the lead part 5A is constructed by winding the conductor a plurality of times between the slot 110, which is provided between the tooth No. 6 and the tooth No. 7 of the teeth 113, and the slot 110 provided between the tooth No. 11 and the tooth No. 12 of the teeth 113. Then, the coil portion 4A is connected to the segment No. 9 of the segments 112 through the lead part 5A. Subsequently, the construction of the coil portion 4A connected to the No. 9 of the segments 112 is resumed by further winding the conductor a plurality of times between the slot 110, which is provided between the tooth No. 7 and the tooth No. 8 of the teeth 113, and the slot 110 provided between the tooth No. 12 and the tooth No. 13 of the teeth 113. Then, the coil portion 4A is connected to the segment No. 10 of the segments 112 through the lead part 5A. Thus, each of the coil portions 4A is formed by changing the segment to be connected thereto and the slot 110, in which this coil portion is mounted, to the adjoining one of the segments 112 and the adjacent one of the slots 110, respectively. Consequently, the upper side portion of the winding 3 is manufactured.

Third Embodiment

Figure 8:
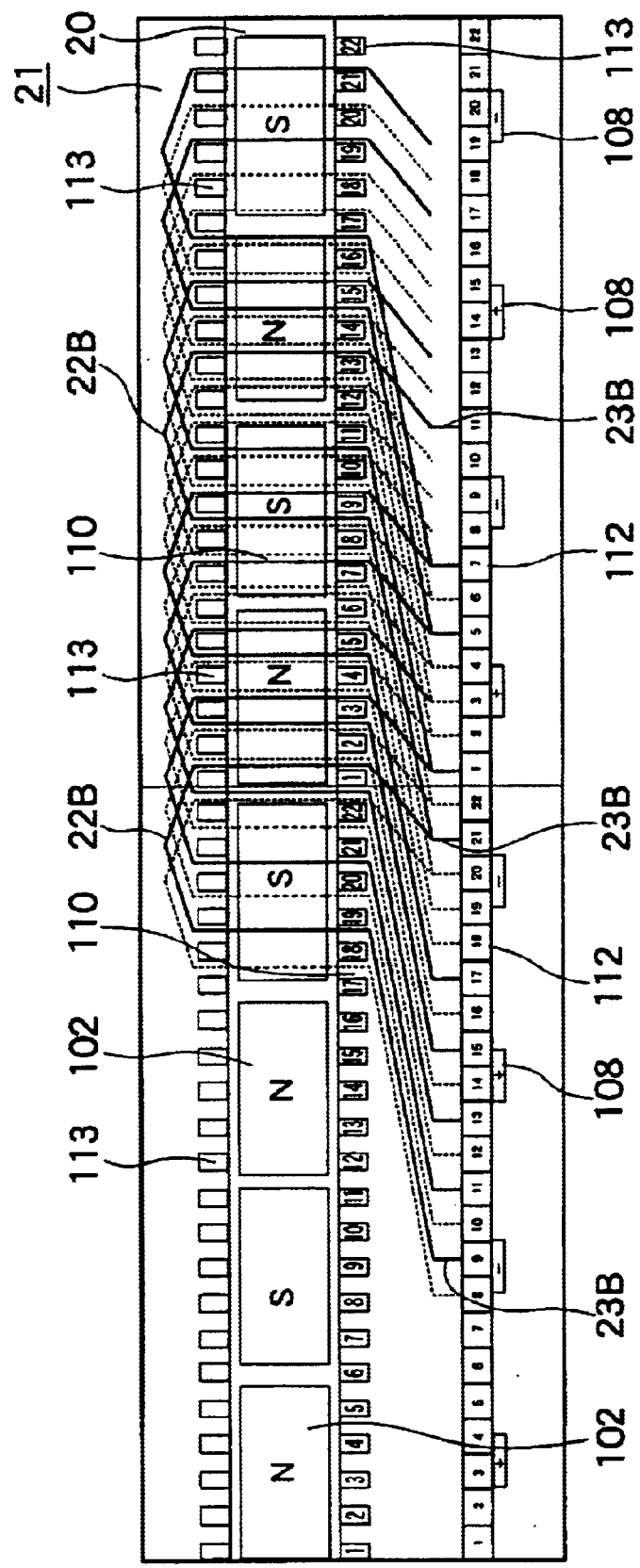
FIG. 8 is a winding diagram illustrating a lower-side winding of a motor for use in an electric power steering system, which is a third embodiment of the present invention.
Figure 9:
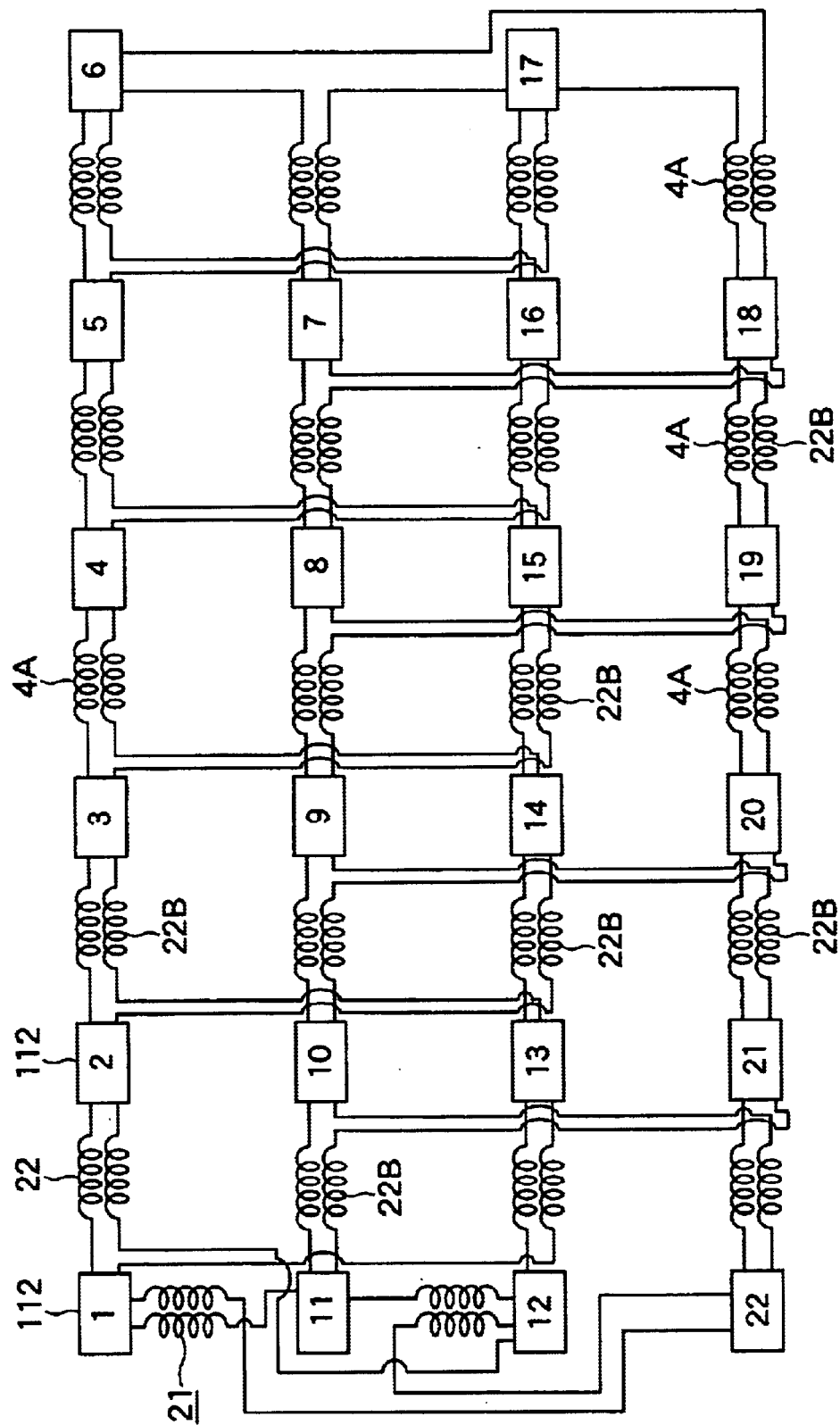
FIG. 9 is a circuit diagram illustrating an electric circuit of the motor shown in FIG. 8 for use in an electric power steering system.

FIG. 8 is a winding diagram of the lower-side winding 21 of a motor, which is a third embodiment, for use in an electric power steering system. FIG. 9 is a circuit diagram illustrating an electric circuit of the winding 21. Incidentally, the upper-side winding of this motor is the same as illustrated in FIG. 2.

In the third embodiment, the upper-side or outer-side coil portion 4A of the winding 21 of the armature 20 is lap-wound, similarly as in the case of the first embodiment and the second embodiment. Each of the coil portions 4A is formed by changing the segment to be connected thereto and the slot 110, in which this coil portion is mounted, to the adjoining one of the segments 112 and the adjacent one of the slots 110, respectively. Thus, the upper side portion of the winding 21 is manufactured.

On the other hand, as illustrated in FIG. 8, the lower side or inner side coil portion 22B of the winding 21 of the armature 20 is formed by what is called the wave winding. The coil portions 22B are respectively disposed at places at which these portions face each other mechanically.

For example, the wave-wound coil portion 22B connected to the segment No. 9 of the segments 112 is constructed by winding the conductor a plurality of times between the slot, which is provided between the tooth No. 18 and the tooth No. 19 of the teeth 113, and the slot 110 provided between the tooth No. 1 and the tooth No. 2 of the teeth 113. Then, the coil portion 22B is connected to the segment No. 21 of the segments 112 through the lead part 23B. The construction of this wave-wound coil portion 22B connected to the segment No. 21 of the segment 112 through the lead part 23B is resumed by further winding the conductor a plurality of times between the slot 110, which is provided between the tooth No. 8 and the tooth No. 9 of the teeth 113, and the slot 110 provided between the tooth No. 13 and the tooth No. 14 of the teeth 113. Subsequently, the coil portion 22B is connected to the segment No. 11 of the segments 112 through the wave-wound lead part 23B.

In the case of the third embodiment, the coil portion 22B starts winding from the segment No. 9 of the segments 112 but does not employ the segment No. 10 as the end point. This coil portion 22B is connected to the segment No. 21 that is apart from this segment by 180 degrees in terms of a mechanical angle. In the case of connecting wires in such a manner, in a certain direction of rotation, the magnetic forces can be balanced, similarly as in the case of the first embodiment. However, in the opposite direction, the magnetic forces cannot be balanced. Thus, when there is variation in the characteristics of the brushes, there is a fear that an electromagnetic exciting force is generated. That is, the third embodiment can provide magnetic-force balance in a certain use, the direction of rotation corresponding to which is determined as a specific direction, by reducing the lead part 23B as much as possible.

Incidentally, the wave-wound coil portion may be composed of a plurality of parallel-connected small coil portions. Further, the lap-wound coil portion may be constituted by a plurality of parallel-connected small coil portions. Thus, thinner conductors can be used for forming the coil portions. Consequently, this embodiment has advantage in that the workability in winding the conductors is enhanced.

Fourth Embodiment

Figure 10:
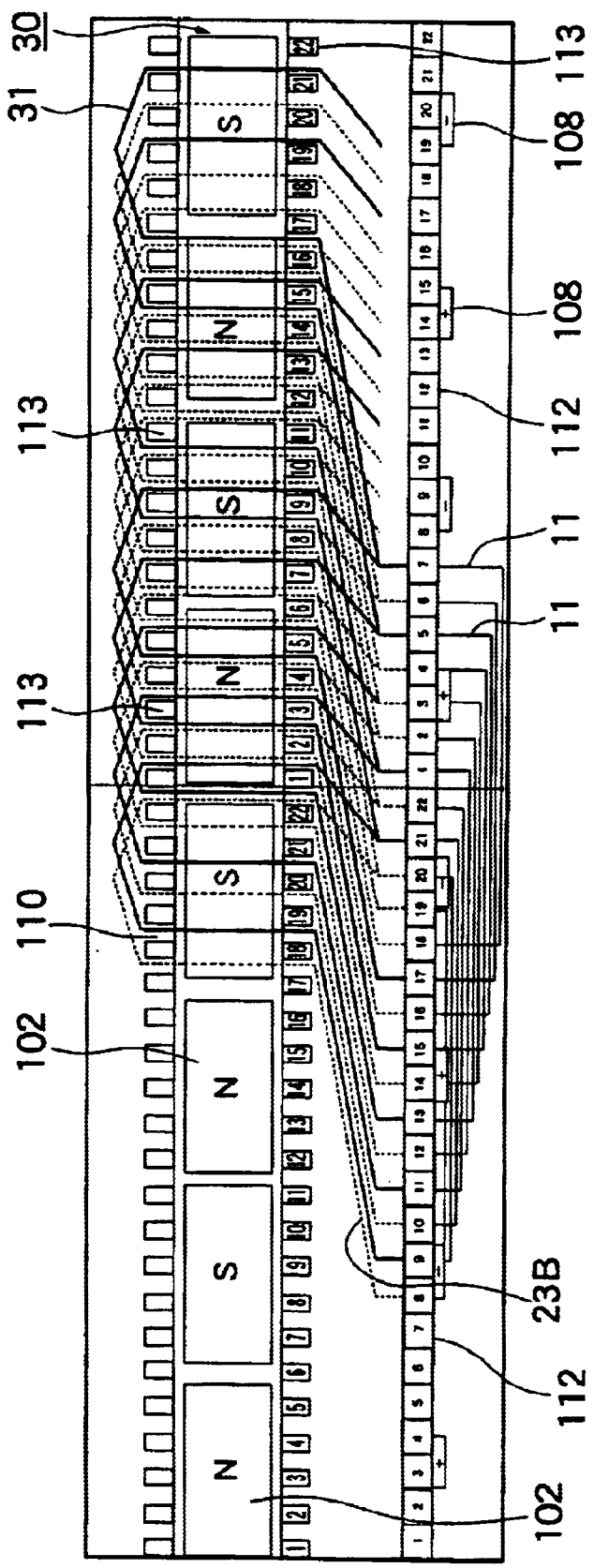
FIG. 10 is a winding diagram illustrating a lower-side winding of a motor for use in an electric power steering system, which is a fourth embodiment of the present invention.
Figure 11:
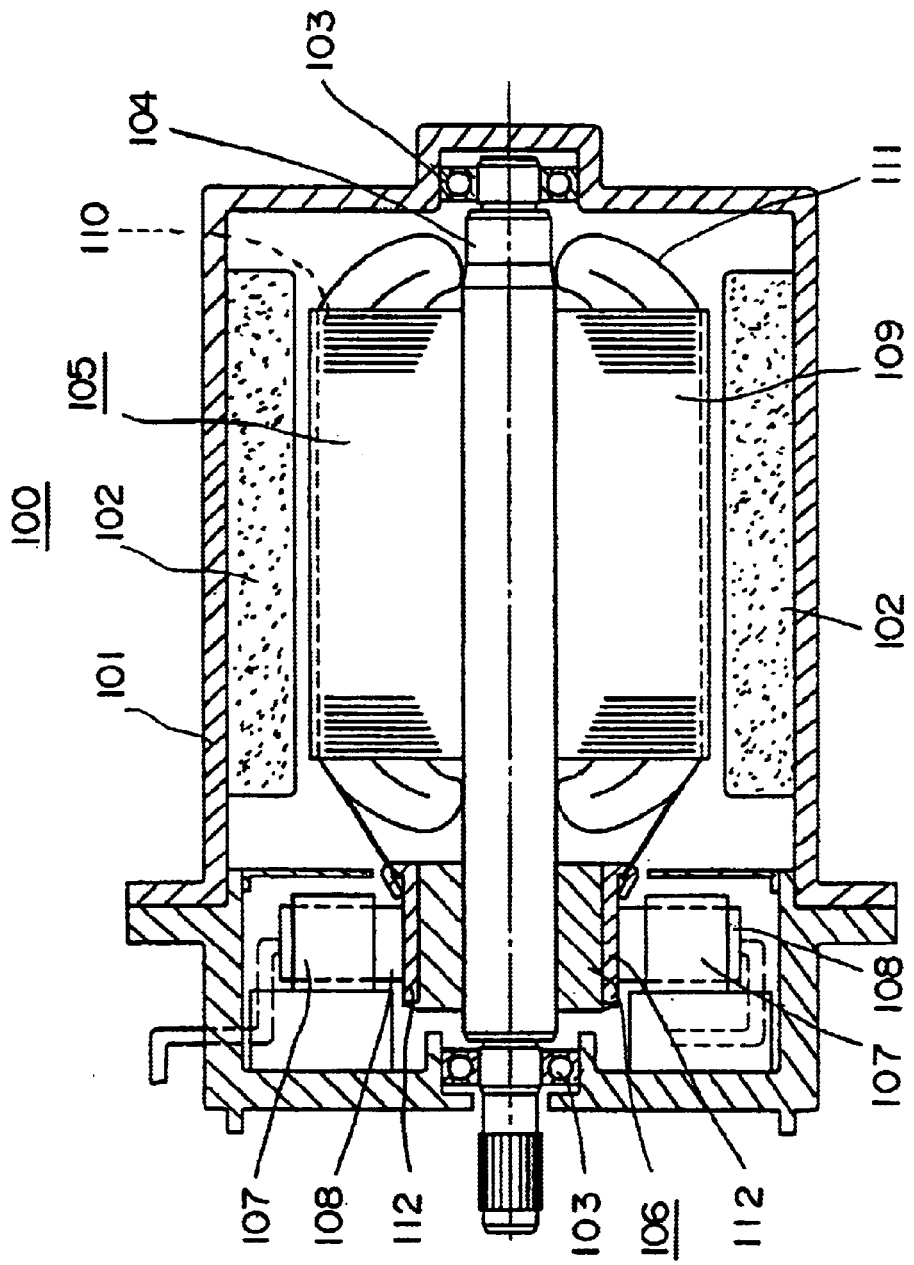
FIG. 11 is a sectional diagram illustrating a conventional motor for use in an electric power steering system.
Figure 12:
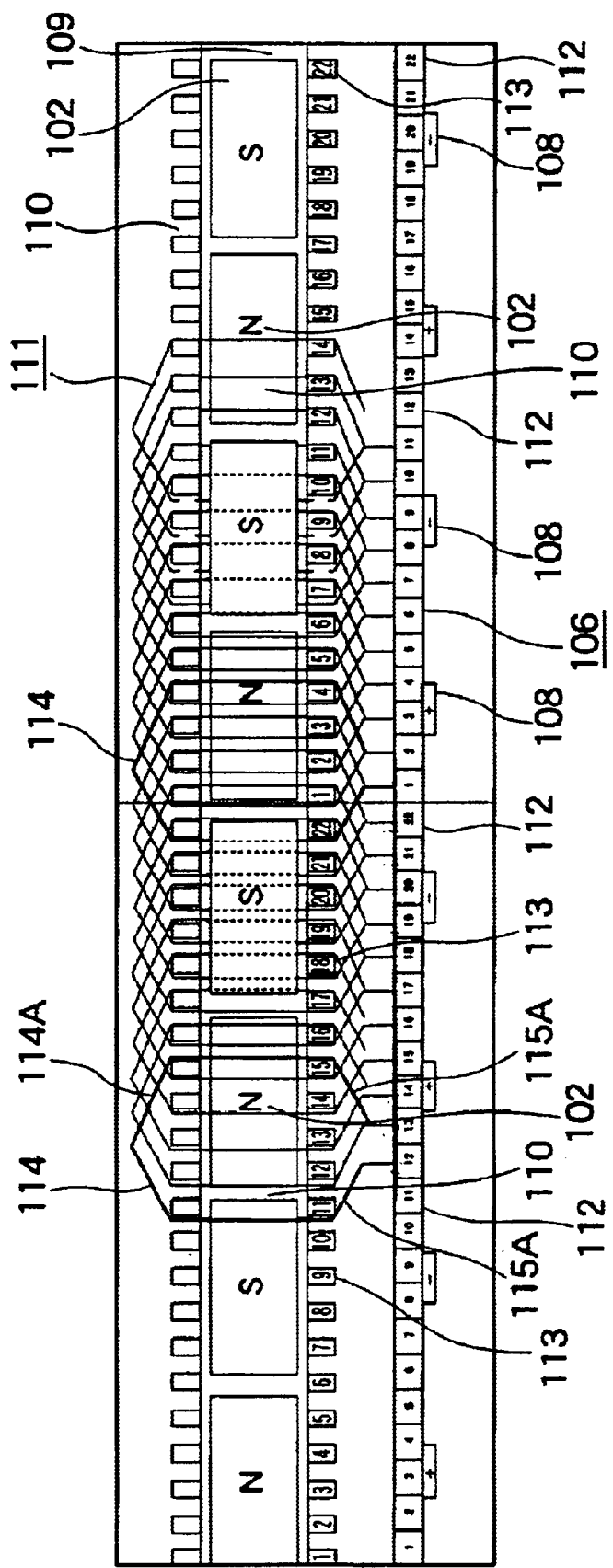
FIG. 12 is a winding diagram illustrating an upper-side winding of the motor shown in FIG. 11 for use in an electric power steering system.
Figure 13:
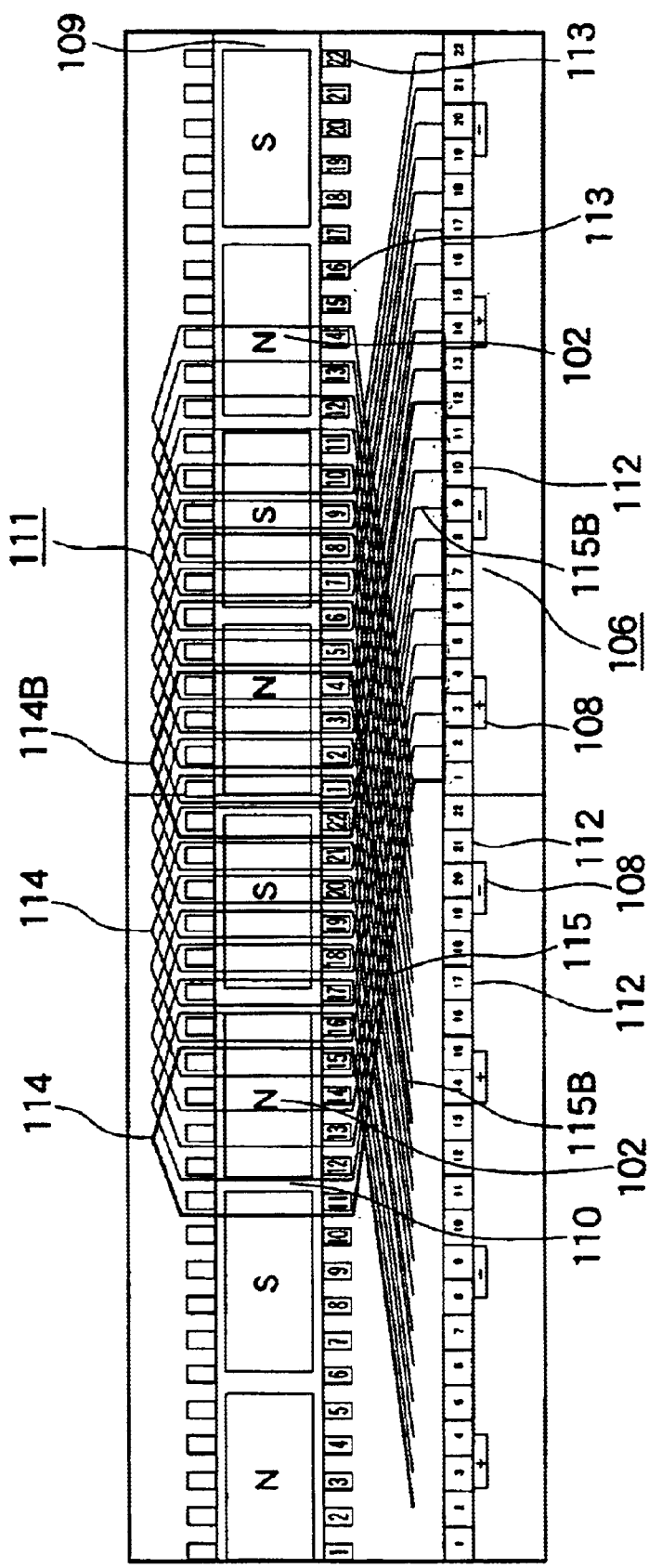
FIG. 13 is a winding diagram illustrating a lower-side winding of the motor shown in FIG. 11 for use in an electric power steering system.
Figure 14:
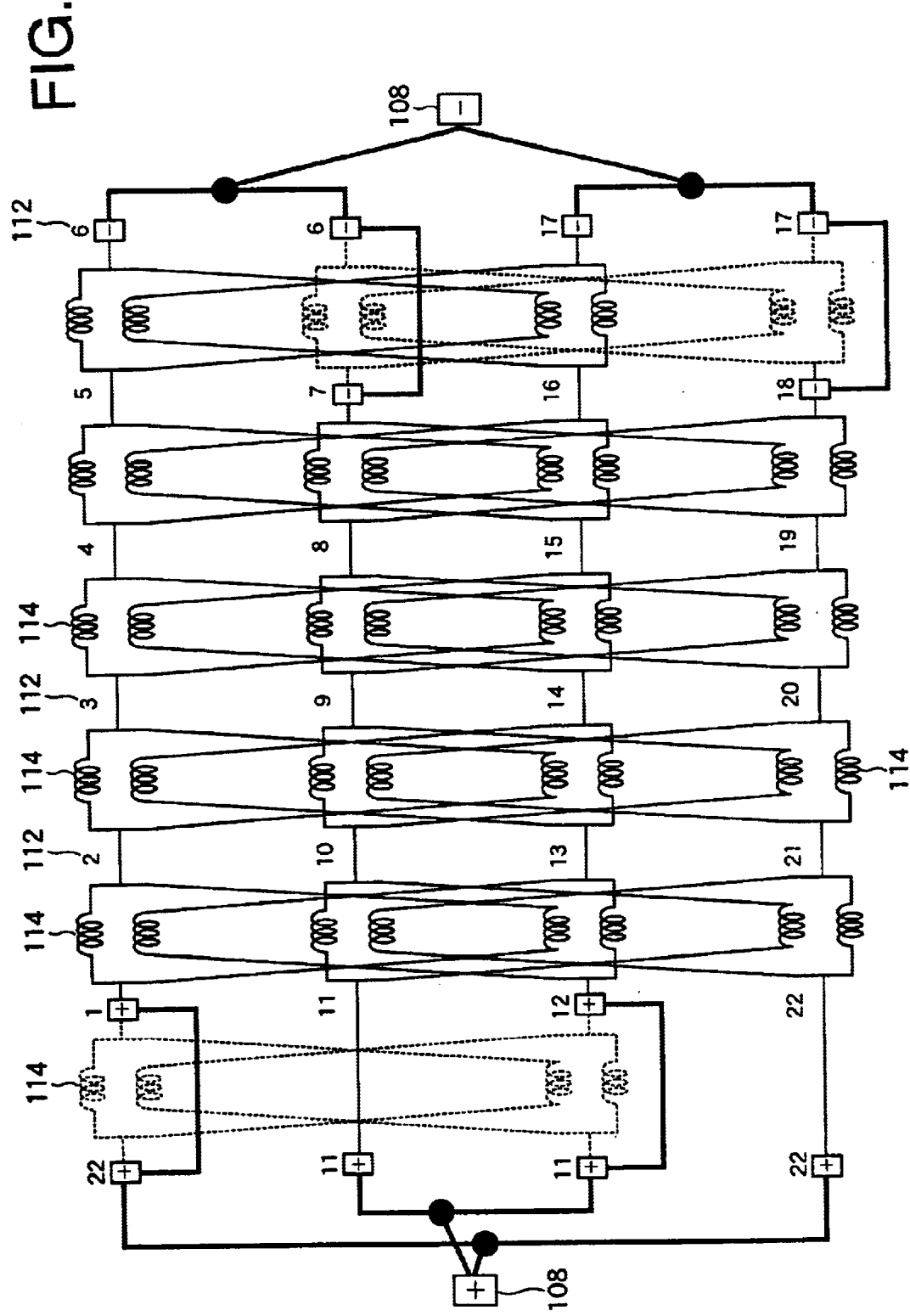
FIG. 14 is a circuit diagram illustrating an electric circuit of the motor shown in FIG. 11 for use in an electric power steering system.
Figure 15:
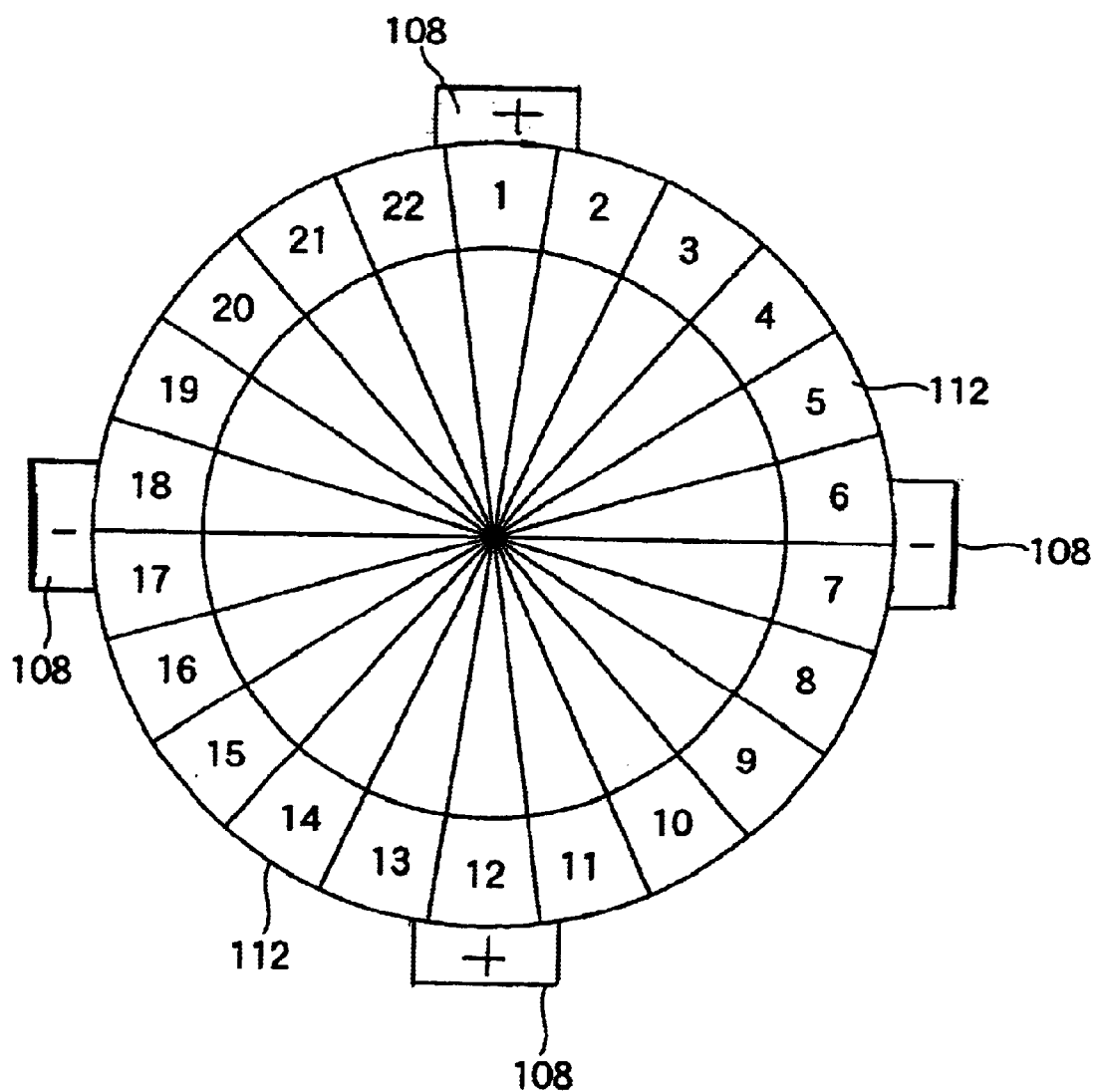
FIG. 15 is a diagram illustrating the relation between the brushes and the segments shown in FIG. 11.

FIG. 10 is a winding diagram illustrating the lower side winding 31 of the armature 30 of a motor, which is a fourth embodiment, for use in an electric power steering system. Incidentally, the upper-side winding of this motor is the same as illustrated in FIG. 2.

The fourth embodiment differs from the third embodiment in that the segments 112, which should be at equal electric potential, are connected to each other by the equalizer 11.

In the motor, which is the fourth embodiment, for use in an electric power steering system, the segments 112, which should be at equal electric potential, are electrically connected to each other by using the equalizer 11. Thus, a circulating current is prevented from flowing through circuit portions between the brushes 108 of the winding 31 owing to the difference among voltages induced in the circuit portions. Additionally, an occurrence of magnetic-attraction-force imbalance due to the difference in the number of coil portions 32 among the electric circuit portions is prevented.

Incidentally, in the fourth embodiment, members made of the same material, that is, enamel-coated round wires may be used as the conductor and the equalizer 11, and the winding 31 and the equalizer 11 may be continuously connected to each other, similarly as in the case of the second embodiment. Further, when windings are manufactured, windings may be produced by using one nozzle of a wiring machine. Alternatively, windings may be manufactured by using a plurality of nozzles and simultaneously winding conductors. Moreover, the equalizers 11 may be suitably reduced as required. Furthermore, in the first to fourth embodiments, the upper-side coil portions of the wiring may be replaced with the lower-side coil portions thereof. Additionally, the present invention can be applied to dynamo-electric machines other than the motor for use in an electric power steering system.

As described above, a dynamo-electric machine according to one aspect of the present invention comprises a yoke, magnetic poles fixed in this yoke, a shaft rotatably provided in the yoke, an armature having a winding consisting of a plurality of coil portions each formed by lap-winding a conductor between a corresponding pair of slots formed in an outer circumferential surface portion of a core fixed to this shaft in such a way as to extend in an axial direction thereof, a commutator fixed to an end portion of the shaft and having a plurality of segments to which lead parts of both end sections of the coil portions are electrically connected, and brushes made to respectively abut against the surfaces of the segments of the commutator, wherein n (incidentally, "n" is a common divisor of the number of the magnetic poles and the number of the slots and equal to or more than 2) of the coil portions are parallel-connected between the segments, wherein the coil portions are disposed in such a manner as to be symmetrical with respect to a mechanical angle of 360 degrees, wherein Lead parts of the coil portions other than one of the coil portions, which is nearest in a circumferential direction to each of the segments, are drawn therefrom in a same circumferential direction. Thus, the workability in wiring is enhanced and an occurrence of defective insulation is suppressed because the lead parts of the coil portions disposed at places, at which mechanical balance is provided do not intersect each other.

According to another aspect of the present invention, a dynamo-electric machine comprises a shaft, an armature having a winding consisting of a plurality of coil portions formed by lap-winding and wave-winding a conductor between each pair of slots formed in an outer circumferential surface portion of a core fixed to this shaft in such a way as to extend in an axial direction thereof, a commutator fixed to an end portion of the shaft and having a plurality of segments to which lead parts of both end sections of the lap-wound and wave-wound coil portions are electrically connected, and brushes made to respectively abut against the surfaces of the segments of the commutator, wherein the lap-wound coil portion and the wave-wound coil portion, the respective of which have lead parts to be connected to a same one of the segments, are disposed in such a manner as to be symmetrical with respect to a mechanical angle of 360 degrees, wherein both lead parts of the wave-wound coil portions are drawn therefrom in a same circumferential direction. Thus, the workability in wiring is enhanced and an occurrence of defective insulation is suppressed because the lead parts of the wave-wound coil portions disposed at places, at which mechanical balance do not intersect each other.

According to one form of the dynamo-electric machine, each of the coil portions may comprise a plurality of small coil portions parallel-connected to one another. Thus, the conductors of small coil portions wound around the core become thinner for that. Consequently, the workability in wiring is enhanced still more. The miniaturization of the dynamo-electric machine is achieved.

According to another form of the dynamo-electric machine, the number of the slots and the number of the segments may be 22. Further, the number of poles may be 4. Moreover, two of the coil portions may be parallel-connected between each pair of the segments. Thus, two of the coil portions between the segments are disposed at opposite places.

According to still another form of the dynamo-electric machine, the dynamo-electric machine further may comprise an equalizer connecting the segments that are to be at equal electric potential. Thus, this prevents a circulating current from flowing through the brushes by way of electric circuit portions owing to the difference among the voltage induced in the electric circuit portions among the brushes of the winding. Moreover, this suppresses an occurrence of magnetic-attraction-force imbalance due to the difference in the number of coil portions among the electric circuit portions. Consequently, a quiet machine is realized. Because change in volume of sounds radiated from the dynamo-electric machine is small even when a load current varies, this is effective especially in the case where a load condition frequently changes in a machine, such as an electric power steering system.

According to still another form of the dynamo-electric machine, the conductor and the equalizer may be constituted by members made of the same material. Further, the winding and the equalizer may be continuously connected to each other. Thus, the efficiency in manufacturing dynamo-electric machines is considerably increased.

According to still another form of the dynamo-electric machine, the conductor may be an enamel-coated round wire. Thus, the mechanization of the operation of winding conductors around the core so as to manufacture dynamo-electric machines is facilitated. Further, the mass production of the armatures is enabled. Consequently, the manufacturing cost of the dynamo-electric machines is reduced.

According to still another form of the dynamo-electric machine, the dynamo-electric machines may be a motor for use in an electric power steering system. Thus, a low-noise low-cost highly-reliable motor for use in an electric power steering system is obtained.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A dynamo-electric machine comprising:

a yoke;

magnetic poles fixed in said yoke;

a shaft rotatably provided in said yoke;

an armature comprising a winding including a plurality of coil portions each formed by lap-winding a conductor between a corresponding pair of slots formed in an outer circumferential surface portion of a core fixed to said shaft in such a way as to extend in an axial direction thereof;

a commutator fixed to an end portion of said shaft and comprising a plurality of segments to which lead parts of both end sections of said coil portions are electrically connected; and brushes made to respectively abut against the surfaces of said segments of said commutator, wherein n of said coil portions are parallel-connected between said segments, where n is a common divisor of the number of the magnetic poles and the number of the slots and equal to or more than 2, wherein said coil portions are disposed in such a manner as to be symmetrical with respect to a mechanical angle of 360 degrees, wherein said lead parts of said coil portions other than one of said coil portions, which is nearest in a circumferential direction to each of said segments, are drawn therefrom in a same circumferential direction for electrical connection to said segments.

2. A dynamo-electric machine comprising:

a shaft;

an armature comprising a winding including a plurality of coil portions formed by lap-winding and wave-winding a conductor between each pair of slots formed in an outer circumferential surface portion of a core fixed to said shaft in such a way as to extend in an axial direction thereof;

a commutator fixed to an end portion of said shaft and comprising a plurality of segments to which lead parts of bath end sections of said lap-wound and wave-wound coil portions are electrically connected; and brushes made to respectively abut against the surfaces of said segments of said commutator, wherein said lap-wound coil portion and said wave-wound coil portion, the respective of which have said lead parts to be connected to a same one of the segments, are disposed in such a manner as to be symmetrical with respect to a mechanical angle of 360 degrees, and wherein both of said lead parts of said wave-wound coil portions are drawn therefrom in a same circumferential direction for electrical connection to said segments.

3. A dynamo-electric machine according to claim 1, each of said coil portions comprises a plurality of small coil portions parallel-connected to one another.

4. A dynamo-electric machine according to claim 1, wherein the number of the slots and the number of the segments are 22, wherein the number of poles is 4, and wherein two of the coil portions are parallel-connected between each pair of said segments.

5. A dynamo-electric machine according to claim 1, further comprising an equalizer connecting said segments that are to be at equal electric potential.

6. A dynamo-electric machine according to claim 5, wherein said conductor and said equalizer are constituted by members made of a same material, and wherein said winding and said equalizer are continuously connected to each other.

7. A dynamo-electric machine according to claim 1, wherein said conductor comprises an enamel-coated round wire.

8. A dynamo-electric machine according to claim 1, wherein said dynamo-electric machine is a motor for use in an electric power steering system.

* * * * *